I. H. DAVIS.
MOTOR LAWN MOWER.
APPLICATION FILED APR. 12, 1913.

1,124,214.

Patented Jan. 5, 1915.

3 SHEETS—SHEET 1.

Witnesses:

Inventor:
I. H. Davis
Attys.

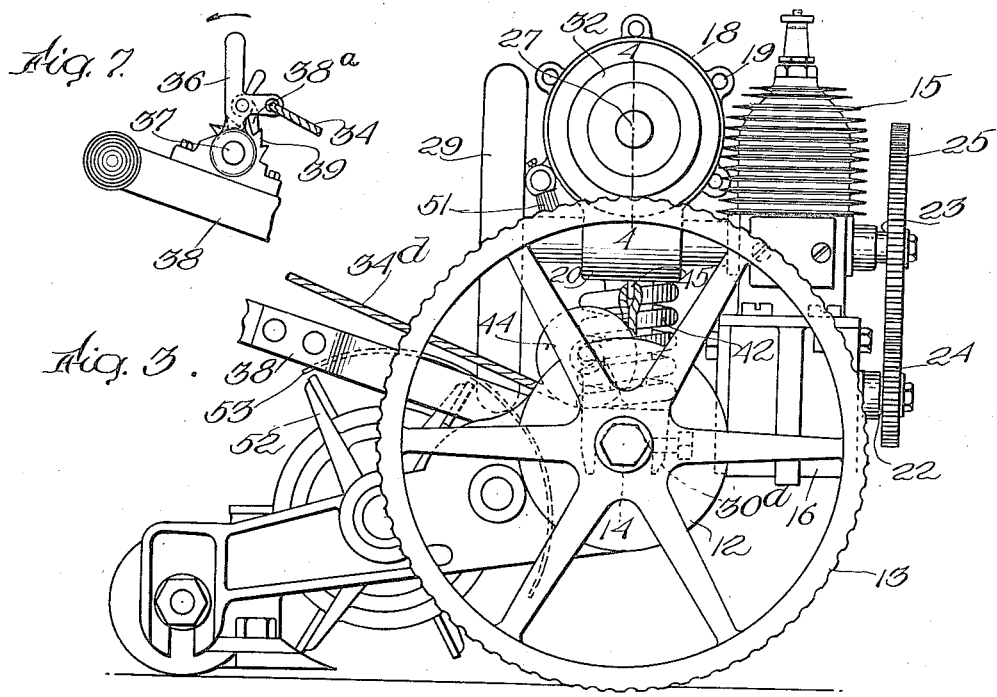
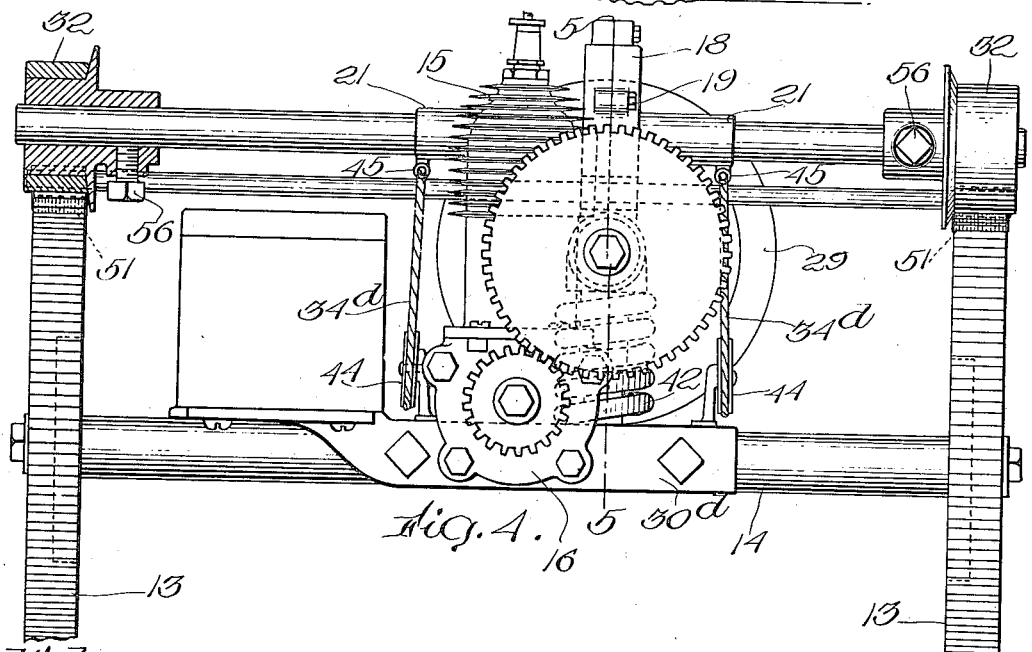

UNITED STATES PATENT OFFICE.

ISAAC H. DAVIS, OF BOSTON, MASSACHUSETTS, ASSIGNOR OF TWO-THIRDS TO H. H. WESTINGHOUSE, OF NEW YORK, N. Y.

MOTOR LAWN-MOWER.

1,124,214.  Specification of Letters Patent.  Patented Jan. 5, 1915.

Application filed April 12, 1913. Serial No. 760,646.

*To all whom it may concern:*

Be it known that I, ISAAC H. DAVIS, a citizen of the United States, and a resident of Boston, in the county of Suffolk and State of Massachusetts, have invented certain new and useful Improvements in Motor Lawn-Mowers, of which the following is a specification.

This invention relates to motor driven lawn mowers and is embodied in an autodynamic attachment comprising a motor the frame of which is provided with means for engaging the usual transverse tie rod forming a part of the mower frame, the motor including a shaft having one or more driving wheels adapted to bear on and be supported by the perimeter of one or both of the traction wheels of the mower, the driving wheel imparting rotary movement to the traction wheel.

The objects and advantages of the invention will be more fully pointed out hereinafter.

Figure 1:
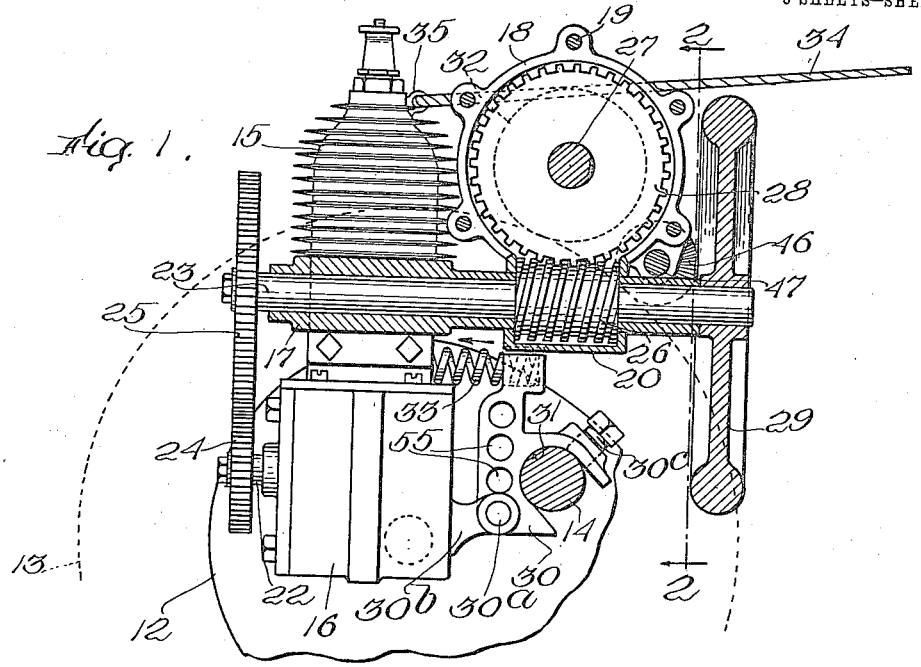
Figure 2:
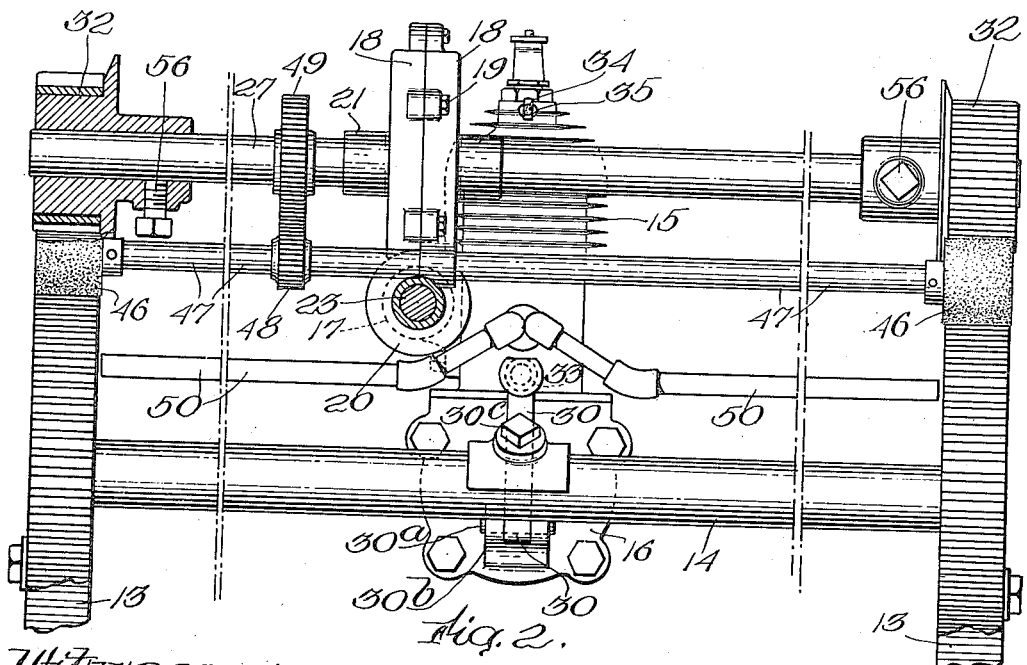
Figure 5:
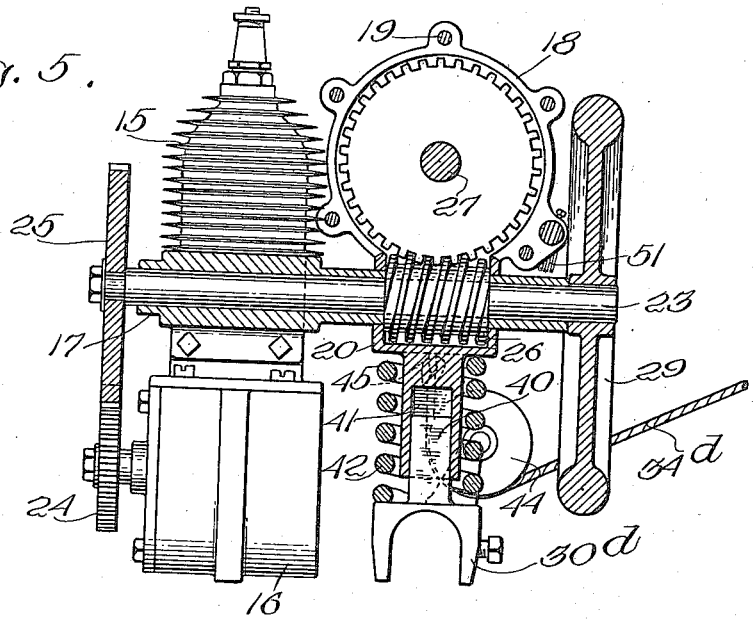
Figure 6:
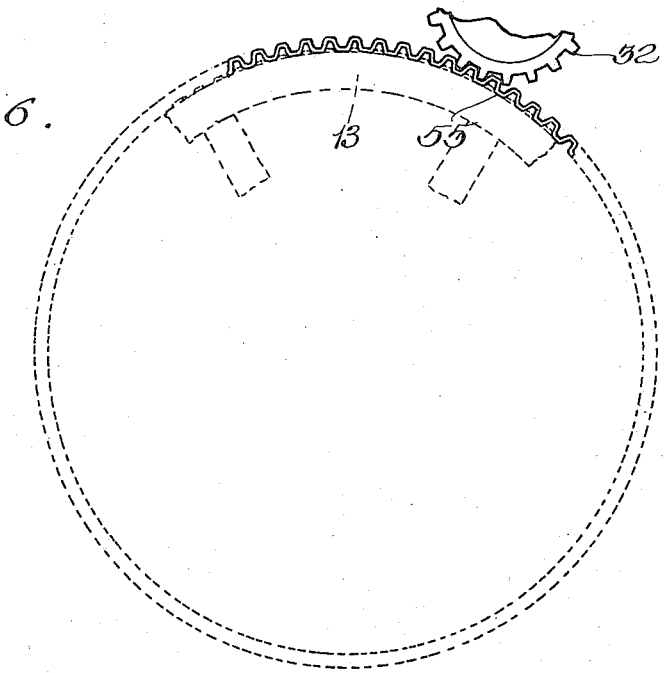

Of the accompanying drawings:—Figure 1 represents a transverse sectional view of a motor attachment embodying my invention, and a portion of a lawn mower to which it is applied. Fig. 2 represents a section on line 2—2 of Fig. 1, and an elevation of the parts at the left of said line. Fig. 3 represents an end view of a lawn mower equipped with a motor attachment embodying the invention and differing in minor particulars from the embodiment shown in Figs. 1 and 2. Fig. 4 represents a front elevation of portions of the machine shown by Fig. 3, a part of Fig. 4 being a section on line 4—4 of Fig. 3. Fig. 5 represents a section on line 5—5 of Fig. 4. Fig. 6 represents an edge view of a gear toothed rim adapted to be applied to a traction wheel of a lawn mower and a portion of a driving wheel engaged therewith. Fig. 7 represents a fragmentary view showing a part of the handle bar of the implement.

The same reference characters indicate the same parts in all the figures.

The frame of an ordinary lawn mower comprises the usual end plates 12 located within the usual traction wheels 13 and connected by a transverse tie rod 14, the traction wheels 13 being journaled on axle arms formed on or attached to the end plates 12 as usual. In some makes of lawn mowers the tie rod 14 is offset from the axes of the traction wheels as shown in Figs. 1 and 2, while in other makes the tie rod is in line with the axes of the traction wheels as shown by Figs. 3 and 4. In carrying out my invention I mount upon the tie rod 14 a motor which is preferably of the internal combustion air cooled type, the frame of the motor here shown for purposes of illustration including a combustion chamber 15, a crank casing 16, an elongated inner bearing 17 extending crosswise of the implement, a gear housing composed of two sections 18 connected by bolts 19, one of said sections forming a part of an enlargement 20 of the bearing 17, and an outer bearing 21 formed on the housing sections 18 and extending at right angles with the inner bearing 17. The movable parts of the motor include the usual crank shaft 22 journaled in the crank casing 16, an intermediate shaft 23 journaled in the inner bearing 17 and connected with the crank shaft by gears 24 and 25, said intermediate shaft being provided with a worm 26, and a power-delivering shaft 27 journaled in the outer bearing 21 and provided with a worm wheel 28 meshing with the worm 26. The intermediate shaft 23 is provided with the usual fly wheel 29. The motor frame is provided with means for engaging the tie rod 14, the engaging means being of such nature that the tie rod engaged thereby supports the motor.

In the embodiment of my invention shown by Figs. 1 and 2, a foot 30 is connected by a pivot bolt 30ª with an ear 30ᵇ on the motor frame, and is provided with a recess 31 formed to receive the tie rod 14. The foot is rigidly attached to the tie rod by a set screw 30ᶜ. The power-delivering shaft 27 is extended to a point over one of the traction wheels and provided with a driving wheel 32 which is adapted to bear on the perimeter of the traction wheel and drive the latter. As shown by Fig. 2, the shaft 27 is extended over each of the traction wheels and is provided at each end with a driving wheel 32. It is obvious, however, that only one driving wheel may be provided. The driving wheel 32 may have gear teeth adapted to engage gear teeth formed on the perimeter of the traction wheel, or the driving wheel may be engaged with the traction wheel by friction, the driving wheel having a suitable frictional surface which may be composed of vulcanized fiber or other material. The driving wheel 32 is arranged to bear on practically the highest part of the perimeter of the traction wheel and is preferably directly over the axis of the traction wheel, or nearly so, so that the motor vibrations are carried downwardly to the earth and are not liable to disturb the balance of the lawn mower and cause an imperfect cut of the grass by the cutting mechanism of the lawn mower. The foot 30 engaged as shown with the tie rod 14 constitutes a fixed support on which the motor frame is adapted to oscillate and move the driving wheel 32 toward and from the perimeter of the traction wheel. Means are provided for yieldingly holding the driving wheel 32 in a predetermined position, and in the embodiment of the invention now being described, in contact with the perimeter of the traction wheel, said means being a spring 33 connected with the upper portion of the foot 30 and adapted to exert pressure on the motor frame in the direction indicated by the arrow in Fig. 1. Means operable by an attendant behind the mower are provided for moving the motor frame and shifting the driving wheel 32 from its predetermined position, and in this case moving it out of contact with the friction wheel, said means including a cord 34 or its equivalent, such as a chain, attached at one end to the motor casing at 35, said cord being adapted to be pulled by the operator to move the motor frame against the force of the spring 33. The cord 34 may be connected with a lever 36, fulcrumed at 37 on the handle bar 38 of the implement, said lever being movable in a direction indicated by the arrow in Fig. 7 to exert a pull on the cord 34, and being provided with a ratchet 38ª engaging one of a series of teeth 39 to lock the lever and maintain the tension on the cord.

In the embodiment of my invention shown by Figs. 3, 4 and 5, the construction is the same as that shown by Figs. 1 and 2 with the following exceptions, first, the foot indicated by 30ᵈ is movable relatively to the motor frame and is provided with a squared shank 40 movable in a squared socket 41 on the motor frame. The foot 30ᵈ is adapted to engage a tie rod 14 which is in line with the axes of the traction wheels. A spring 42 surrounds the telescopic shank formed by the members 40 and 41 and bears at one end on the foot 30ᵈ and at its opposite end on a part of the motor frame, said spring having a tendency to raise the motor frame and move the driving wheel 32 from contact with the traction wheel, the action in this respect being the reverse from that described in connection with Fig. 1 where the spring tends to press the driving wheel against the traction wheel. The manually operable means acting in opposition to the spring 42 are adapted to press the driving wheel against the perimeter of the traction wheel, said means including two cords 34ᵈ which may be attached to a lever 36 such as that shown in Fig. 7, and passing under guide pulleys 44 on the foot 30ᵈ to eyes 45 on the motor frame.

Means are provided for automatically cleaning the perimeter of the traction wheel engaged by the driving wheel 32 and at a point adjacent to the driving wheel. Said means may be variously modified as illustrated by Figs. 1, 2 and 3. Figs. 1 and 2 show a rotary brush 46 attached to a shaft 47 which is journaled in bearings on the motor frame and is connected by gears 48 and 49 with the power-delivering shaft 27, the brush 46 being in contact with the perimeter of the traction wheel. In Figs. 1 and 2 I have also shown an extension 50 of the exhaust pipe of the motor, said extension being arranged to project a blast of the exhaust gases across the perimeter of the traction wheel or against said perimeter in such manner as to remove foreign matter therefrom. Fig. 3 shows a non-rotating brush 51 supported by the motor frame and bearing on the perimeter of the traction wheel.

The cleaning of the driven traction wheel is of much importance in a lawn mower, the traction wheels of which are frequently thickly coated with short pieces of wet grass. These, and other accumulations of foreign matter, are readily removable by either of the cleaning means above described.

The combustion chamber 15 of the motor is preferably so located that it is adapted to be cooled by air set in motion by the revolution of the usual knife reel 52 of a lawn mower, so that the air thus set in motion has a cooling action on the combustion chamber and other parts of the motor. To prevent the wet grass detached by the knives from being thrown upon the motor, I provide a curved screen 53 which is interposed between the knife reel and the motor, said screen being of any suitable foraminous construction permitting the air to pass freely through it and adapted to arrest pieces of grass. The inner surface of the screen is in close proximity to the outer edges of the knives, so that the knives in revolving, prevent obstructing accumulations of grass upon the screen. The lateral movability of the driving wheel toward and from the perimeter of the driven traction wheel is an important feature of my invention, the wheel being thereby adapted to accommodate itself to slight irregularities on the perimeter of the traction wheel, due to imperfect construction, and also adapted to act as a clutch which permits the continued operation of the motor when the revolution of the knives on the lawn mower is suddenly stopped by an obstacle. The latter statement applies more particularly to the driving wheel construction as a friction drive instead of being toothed. The freedom of the driving wheel to slip will also prevent the danger of the motor stopping in cutting high or thick grass. The movability of the driving wheel relative to the traction wheel enables the motor to be speeded up while the driving wheel is separated from the traction wheel, the driving wheel then being brought into contact with the traction wheel to enable the knives to cut an unusual heavy body of grass. The driving wheel may, in some cases, be pressed intermittently against the traction wheel to overcome the resistance of unusual heavy grass.

It will be seen that each of the embodiments of the invention shown by the drawings is an autodynamic attachment adapted to be applied to the tie rod of a lawn mower of ordinary construction without requiring any change or adaptation of the lawn mower to receive the attachment, the attachment being readily removable to enable the machine to be operated by hand as usual. It is obvious, however, that the motor frame may be permanently secured to the frame of the lawn mower, the latter being provided with special means for engagement with the motor frame.

When the driving wheel and the perimeter of the traction wheel are provided with gear teeth, the teeth of the traction wheel may be formed on a resilient steel ring 55, Fig. 6, adapted to be applied to the perimeter of an ordinary traction wheel, the elasticity of the ring enabling it to hug the perimeter of the wheel so that the ring may be applied to wheels slightly differing from each other in diameter.

As shown by Figs. 2 and 4, the driving wheel is adjustably secured to the shaft 27 by suitable means such as a set screw 56, provision being thus made for adapting the autodynamic attachment to lawn mowers of different lengths.

The worm and worm gear forming a part of the power-transmitting mechanism constitute a practical and suitable means of speed-reduction between the crank shaft and the power-delivering shaft of the motor.

Means may be provided for adjusting the described attachment to adapt it to different sizes of traction wheels. This may be accomplished by providing the foot 30 (Fig. 1) with a plurality of holes 55 each adapted to receive the pivot bolt 30ᵃ. The point of pivotal connection of the motor frame with the fixed foot 30 may therefore be raised or lowered and enable the driving wheel 32 to engage traction wheels of different diameters.

I claim:

1. The combination with a wheeled implement having traction wheels and a frame including a transverse tie rod, of a motor the frame of which is provided with means for engaging said tie rod, the power delivering shaft of the motor being provided with a driving-wheel adapted to bear on one of said traction wheels.

2. The combination with a wheeled implement having traction wheels and a frame including a transverse tie rod, of a motor the frame of which is provided with means for engaging the said tie rod, the power-delivering shaft of the motor being provided with a driving-wheel adapted to bear on one of said traction wheels, the motor being movable independently of the frame to vary the position of the driving-wheel relatively to the traction wheel.

3. In combination, a wheeled implement having traction wheels and a frame including a transverse tie rod, a motor, the frame of which is provided with means for engaging said tie rod, said means having provisions for permitting independent movements of the motor, a driving-wheel on the power-delivering shaft of the motor adapted to bear on one of said traction wheels, yielding means for automatically holding the driving-wheel in a predetermined position relatively to the said traction wheel, and manually operable means extending rearwardly from the acting means and adapted to be operated by an attendant behind the implement for moving the driving-wheel from said position.

4. The combination with a wheeled implement having traction wheels and a frame including a transverse tie rod, of an automatic attachment comprising a motor the frame of which has a foot adapted to be supported by the said tie rod, and a driving-wheel on the power-delivering shaft of the motor, adapted to bear on and be supported by one of said traction wheels.

5. The combination with a wheeled implement having traction wheels and a frame including a transverse tie rod, of an autodynamic attachment comprising a motor the frame of which has a foot adapted to be supported by the said tie rod, and a driving-wheel on the power-delivering shaft of the motor, adapted to bear on and be supported by one of said traction wheels, the foot having provisions for permitting independent movements of the motor frame and driving-wheel relatively to the traction wheel.

6. The combination with a wheeled implement having traction wheels and a frame including a transverse tie rod, of an autodynamic attachment comprising a motor the frame of which has a foot adapted to be supported by the said tie rod, and a driving-wheel on the power-delivering shaft of the motor, adapted to bear on and be supported by one of said traction wheels, the relative arrangement of the foot and driving-wheel being such that the driving-wheel is adapted to bear on the upper portion of the perimeter of the traction wheel substantially in the vertical plane of its axis.

7. In combination, a wheeled implement having traction wheels and a frame including a transverse tie rod, a motor the frame of which is provided with means for engaging the said tie rod, a driving-wheel on the power-delivering shaft of the motor, adapted to bear on one of said traction wheels, the said engagement means having provisions for permitting the motor frame and driving-wheel to move relatively to the implement frame and traction wheel, yielding means for automatically holding the driving-wheel in a predetermined position relatively to the traction wheel, and means extending rearwardly from the motor and operable by an attendant behind the implement for changing the position of the driving-wheel.

8. In combination, a wheeled implement having traction wheels and a frame including a transverse tie rod, a motor the frame of which is provided with means for engaging the said tie rod, a driving-wheel on the power-delivering shaft of the motor adapted to bear on one of said traction wheels, the said engaging means having provisions for permitting the motor frame and driving-wheel to move relatively to the tie rod and traction wheel, automatic means for yieldingly pressing the driving-wheel inwardly against the traction wheel, and means operable by an attendant for moving the driving-wheel outwardly from the traction wheel.

9. In combination, a wheeled implement having traction wheels and a frame including a transverse tie rod, a motor the frame of which has a pivoted seat rigidly engaged with said tie rod, a driving-wheel on the power-delivering shaft of the motor adapted to bear on a traction wheel of the implement, a spring interposed between the motor frame and seat and adapted to hold the driving-wheel in yielding engagement with the traction wheel, and a manually operable device for separating the driving-wheel from the traction wheel.

10. In combination, a wheeled implement having traction wheels and a frame including a transverse tie rod, a motor the frame of which is provided with means for engaging the said tie rod, a driving-wheel on the power-delivering shaft of the motor, adapted to bear on one of said traction wheels, the said engaging means having provisions for permitting the motor frame and driving-wheel to move relatively to the tie rod and traction wheel, yielding means for automatically holding the driving-wheel in a predetermined position relatively to the traction wheel, and a manually operable device for changing the position of the driving-wheel, said device comprising a lever fulcrumed on the frame of the implement, a flexible cord or its equivalent connecting the lever with the motor frame, and means for locking said lever to hold the driving-wheel in its changed position.

11. The combination with a wheeled implement having traction wheels and a frame including a transverse tie rod, of a motor the frame of which is provided with means for engaging said tie rod, and with inner and outer bearings at right angles with each other, and a gear housing, the motor having a crank shaft, an intermediate shaft journaled in the inner bearing, and geared to the crank shaft, said intermediate shaft being provided with a worm, and a power-delivering shaft journaled in the outer bearing and provided with a worm wheel meshing with said worm, and with a driving-wheel adapted to impart forward motion to one of said traction wheels and to be supported by said traction wheel.

12. The combination with a wheeled implement having traction wheels and a frame including a transverse tie rod, of a motor the frame of which is provided with adjustable means for engaging the said tie rod, the power-delivering shaft of the motor being provided with a driving wheel and also adapted, by the adjustability of said engaging means, to bear on traction wheels of different diameters.

13. The combination with a wheeled implement having traction wheels and a frame including a transverse tie rod, of a motor the frame of which is provided with means for engaging said tie rod, said motor having a power-delivering shaft and a driving-wheel thereon adapted to engage one of said traction wheels, the motor being provided with speed-reducing connections between the power-delivering shaft and the crank shaft.

14. A wheeled implement having traction wheels and a frame including a transverse tie rod, having a resilient gear-toothed ring forming the perimeter of one of said traction wheels, combined with a motor mounted on the said tie rod and provided with a toothed driving-wheel meshing with said ring.

In testimony whereof I have affixed my signature, in presence of two witnesses.

ISAAC H. DAVIS.

Witnesses:
C. F. Brown,
P W. Pezzetti.